(12) United States Patent
Hemph et al.

(10) Patent No.: US 11,014,171 B2
(45) Date of Patent: May 25, 2021

(54) DRILL BODY AND DRILL

(71) Applicant: SANDVIK INTELLECTUAL PROPERTY AB, Sandviken (SE)

(72) Inventors: Rasmus Hemph, Gavle (SE); Hakan Carlberg, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 16/612,068

(22) PCT Filed: May 3, 2018

(86) PCT No.: PCT/EP2018/061384
§ 371 (c)(1),
(2) Date: Nov. 8, 2019

(87) PCT Pub. No.: WO2018/206401
PCT Pub. Date: Nov. 15, 2018

(65) Prior Publication Data
US 2020/0139458 A1     May 7, 2020

(30) Foreign Application Priority Data

May 11, 2017 (EP) .................................. 17170613

(51) Int. Cl.
*B23B 51/04* (2006.01)
(52) U.S. Cl.
CPC .... *B23B 51/0493* (2013.01); *B23B 2251/406* (2013.01); *B23B 2251/408* (2013.01); *B23B 2251/50* (2013.01)

(58) Field of Classification Search
CPC .......... B23B 51/0493; B23B 2251/406; B23B 2251/50
See application file for complete search history.

(56) References Cited

U.S. PATENT DOCUMENTS 5,676,499 A * 10/1997 Tukala ................ B23B 51/0493
                                                              408/223
5,782,587 A * 7/1998 Basteck ................ B23B 51/048
                                                              408/59

(Continued)

FOREIGN PATENT DOCUMENTS

DE    3545586 A1    7/1987
EP    0876868 A1   11/1998

(Continued)

*Primary Examiner* — Eric A. Gates
(74) *Attorney, Agent, or Firm* — Corinne R. Gorski

(57) ABSTRACT

A drill body and a drill are disclosed. The drill body has a rotational axis and includes a peripheral chip flute extending along a periphery of the drill body. A peripheral chip flute cross-section has a centre line extending in a plane extending perpendicularly to the rotational axis, and through the rotational axis. The peripheral chip flute cross-section has a radially inner side extending perpendicularly to the centre line, and first and second lateral sides connecting to the radially inner side. The radially inner side has a length L1 within a range of L1=0.95×D/4 to L1=1.2×D/4. Each of the first and second lateral sides has a length LS1, LS2 within a range of D/4 to 1.3×D/4. The first and second lateral sides diverge from each other in a direction radially outwards from the radially inner side.

16 Claims, 5 Drawing Sheets

(56) References Cited

U.S. PATENT DOCUMENTS

| | | | | |
|---|---|---|---|---|
| 5,947,653 A | * | 9/1999 | Hamberg | B23B 51/0493 |
| | | | | 408/59 |
| 5,993,119 A | * | 11/1999 | Moller | B23B 51/0493 |
| | | | | 408/229 |
| 8,668,409 B2 | | 3/2014 | Mergenthaler | |
| 9,364,927 B2 | * | 6/2016 | Bohn | B23P 15/28 |
| 2020/0139457 A1 | * | 5/2020 | Hemph | B23B 51/0493 |

FOREIGN PATENT DOCUMENTS

| | | | | | |
|---|---|---|---|---|---|
| GB | 2184373 A | * | 6/1987 | | B23B 51/048 |
| JP | S63216610 A | | 9/1988 | | |
| JP | S63237807 A | | 10/1988 | | |
| JP | 2001277022 A | * | 10/2001 | | |
| KR | 20040086960 A | | 10/2004 | | |
| SU | 494229 A | * | 3/1976 | | |

\* cited by examiner

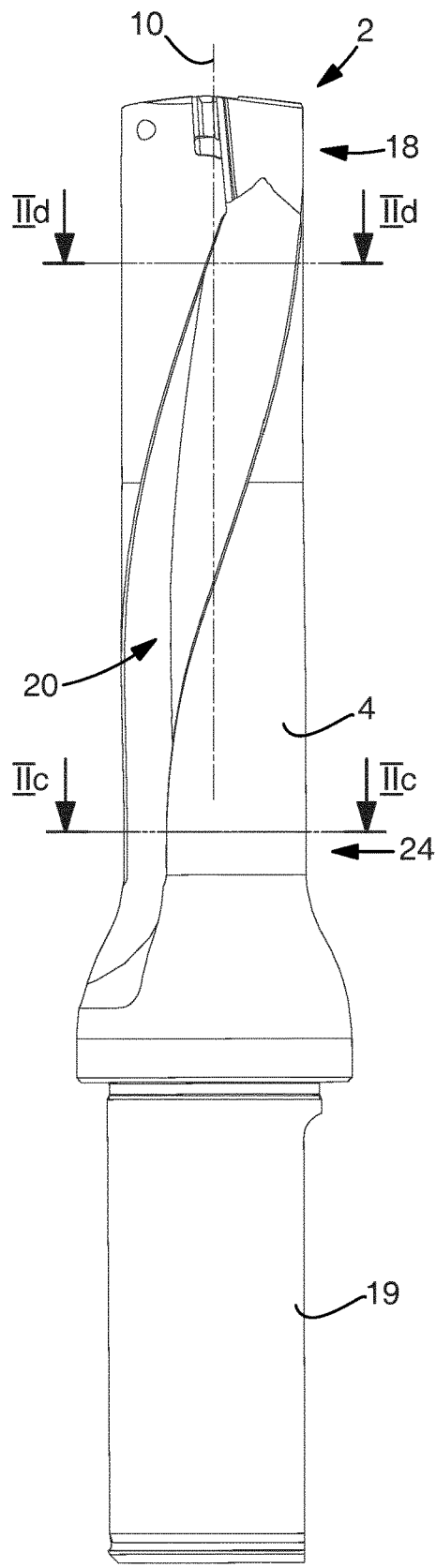
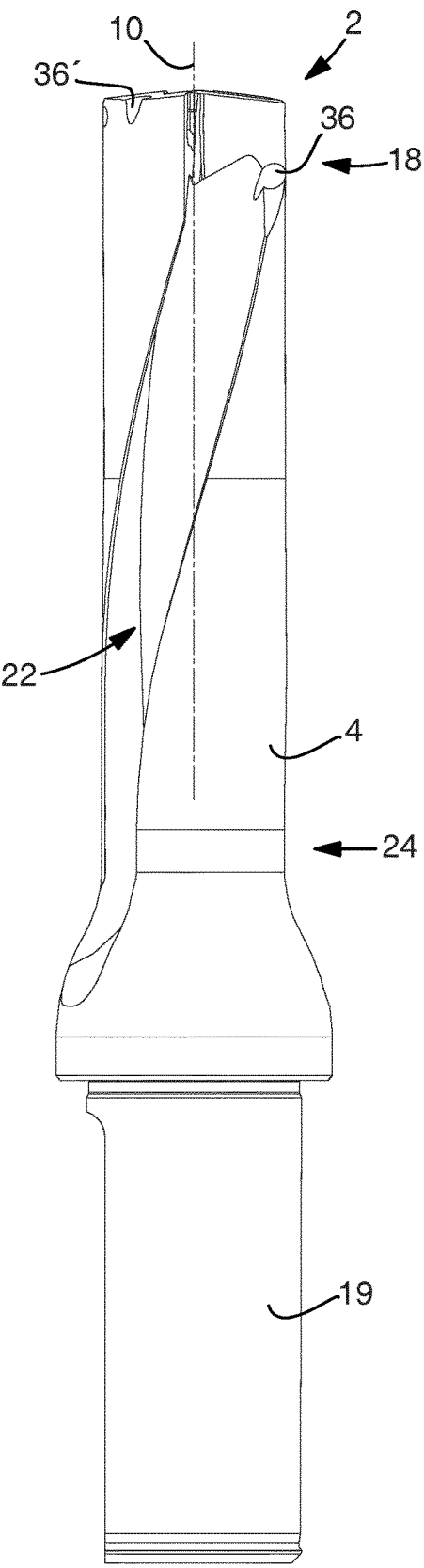
*Fig 2a*  *Fig 2b*

DRILL BODY AND DRILL

RELATED APPLICATION DATA

This application is a § 371 National Stage Application of PCT International Application No. PCT/EP2018/061384 filed May 3, 2018 claiming priority to EP 17170613.8 filed May 11, 2017.

TECHNICAL FIELD

The invention relates to a drill body for a drill, and to a drill, for metal cutting.

BACKGROUND

A drill is configured for cutting holes in a workpiece. The present invention relates to drills for cutting workpieces using a manually operated machine, such as a drill press, or an automatically controlled machine, such as a CNC lathe, a CNC milling machine, or a CNC drilling machine.

An indexable drill comprises a drill body and two or more indexable cutting inserts arranged in insert seats at a front end portion of the drill body. One of the cutting inserts may be configured for cutting a central portion of a hole and another cutting insert may be configured for cutting a peripheral portion of the hole. The cutting inserts are indexable, i.e. they each comprise more than one cutting edge, and are positionable in different positions in the insert seats for each cutting edge to engage with the workpiece.

During drilling of a hole, cutting chips cut from the workpiece by the cutting inserts at the front end portion of the drill body must be removed from the hole. For this purpose, one or more chip flutes may extend along the drill body.

U.S. Pat. No. 8,668,409 discloses an indexable drill including a drill body having two chip flutes extending a distance along the drill body. Two indexable cutting inserts are fastened, radially offset in relation to one another, in respective insert seats of the drill body. Each chip flute, viewed cross-sectionally in a direction perpendicular to a longitudinal axis of the drill body, includes a first wall portion and a second wall portion. The first wall portion extends along a curve between a run-out edge and the second wall portion. The second wall portion extends in a straight line between a leading edge and the first wall portion. The first wall portion and the second wall portion are disposed adjoining one another and together define a J-shaped cross-sectional profile perpendicular to the longitudinal axis.

The drilling of long holes, such as 4 times a diameter of the hole or longer, poses particular requirements on the relevant drill. While cutting chips must be transported all the way from the bottom of the hole, the drill must deflect minimally in a radial direction in order to achieve a high quality hole.

SUMMARY

It is an object of the invention to provide a drill body for a drill, which provides for efficient removal of cutting chips while being suited for drilling long holes. To better address one or more of these concerns, a drill body and a drill having the features defined in the independent claims is provided.

According to an aspect of the invention, the object is achieved by a drill body for a drill, the drill body having a rotational axis and being provided with a central insert seat and a peripheral insert seat at a front end portion of the drill body. The central insert seat is configured for receiving a central cutting insert for cutting a central portion of a hole having a hole diameter D, and the peripheral insert seat is configured for receiving a peripheral cutting insert for cutting a peripheral portion of the hole. The drill body comprises a central chip flute extending from the central insert seat along a periphery of the drill body and a peripheral chip flute extending from the peripheral insert seat along a periphery of the drill body. The central chip flute has a central chip flute cross section in a plane extending perpendicularly to the rotational axis, and the peripheral chip flute has a peripheral chip flute cross section in the plane extending perpendicularly to the rotational axis, each of the central chip flute cross section and the peripheral chip flute cross section being formed within a circumscribed circle of the drill body in the plane extending perpendicularly to the rotational axis. The peripheral chip flute cross section has a centre line extending in the plane and through the rotational axis, wherein the peripheral chip flute cross section has a radially inner side extending perpendicularly to the centre line, and a first lateral side and an opposite second lateral side connecting to the radially inner side, wherein the radially inner side has a length L1 within a range of $L1=0.95 \times D/4$ to $L1=1.2 \times D/4$, wherein each of the first and second lateral sides has a length LS1, LS2 within a range of $D/4$ to $1.3 \times D/4$, and wherein the first and second lateral sides diverge from each other in a direction radially outwards from the radially inner side.

Since the radially inner side has a length L1 within a range of $L1=0.95 \times D/4$ to $L1=1.2 \times D/4$, since each of the first and second lateral sides has a length LS1, LS2 within a range of $D/4$ to $1.3 \times D/4$, and since the first and second lateral sides diverge from each other in a direction radially outwards from the radially inner side, cutting chips from the peripheral cutting insert will readily fit inside the peripheral chip flute, while a cross section of the drill body in the plane extending perpendicularly to the rotational axis provides high bending stiffness and torsional stiffness. Accordingly, high quality holes may be cut in a workpiece. As a result, the above mentioned object is achieved.

According to a further aspect, the object is achieved by a drill for metal cutting comprising a drill body having a rotational axis and being provided with a central insert seat and a peripheral insert seat at a front end portion of the drill body, a central cutting insert for cutting a central portion of a hole having a hole diameter D arranged in the central insert seat, and a peripheral cutting insert for cutting a peripheral portion of the hole arranged in the peripheral insert seat. The drill body is a drill body according to any one of aspects and/or embodiments discussed herein. As mentioned above, due to the dimensions of the peripheral chip flute cross section, cutting chips from the peripheral cutting insert will readily fit inside the peripheral chip flute, while high bending stiffness and torsional stiffness is provided in the drill body of the drill.

Since the bending stiffness is dependent on the second moment of area, also known as area moment of inertia, having a unit which is the fourth power of a length unit, e.g. $m^4$, solid portions of the cross section of the drill body extending as far as possible from the rotational axis provide for a stiff drill body. The radially inner side length L1 and the first and second lateral sides lengths LS1, LS2, as defined above, provide for a large portion of the cross section of the drill body to extend a large radial distance from the rotational axis.

The drill body has a drilling length L, i.e. the length of the drill body used for drilling the maximum hole depth possible with the relevant drill, less the axial depth provided by the cutting inserts, i.e. the maximum hole depth less the axial extension of the cutting inserts beyond the drill body.

According to embodiments, the radially inner side may extend symmetrically about the centre line. In this manner, the peripheral chip flute cross section, within the range provided by the lengths of the first and second lateral sides, may be approximately symmetrical about the centre line of the peripheral chip flute. Thus, the cross section of the drill body may be approximately symmetrical about the peripheral chip flute. This provides for a stable drill body, the bending properties of which may be predictable.

According to embodiments, the first and second lateral sides may diverge symmetrically from each other about the centre line. In this manner, the peripheral chip flute cross section may be symmetrical about the centre line of the peripheral chip flute. Thus, also the cross section of the drill body may be symmetrical about the peripheral chip flute. This provides for a stable drill body, the bending properties of which may be easily predictable.

According to embodiments, ends of the first and second lateral sides opposite to the radially inner side may be arranged at a distance L2 from each other within a range of L2=1.85×D/4 to L2=2.5×D/4. In this manner, it may be ensured that cutting chips from the peripheral cutting insert readily fit inside the peripheral chip flute to be guided from the front end portion of the drill body out of a hole being drilled.

According to embodiments, the drill body may comprise at least one coolant channel. In this manner, a coolant may be provided in a proximity of the cutting inserts during drilling with the drill. Thus, in addition to cooling the workpiece and the cutting inserts, the coolant may assist in transporting cutting chips in the peripheral chip flute and/or the central chip flute, from the front end portion of the drill body and out of the hole being drilled.

Suitably, the at least one coolant channel is provided with an opening at the front end portion of the drill body.

According to embodiments, drill body may comprise two coolant channels. In this manner, a coolant may be provided in a proximity of each of the peripheral and central cutting inserts during drilling with the drill. The coolant may assist in transporting cutting chips in the peripheral chip flute and the central chip flute, from the front end portion of the drill body and out of the hole being drilled.

According to embodiments, each of the coolant channels may have a diameter Df within a range of $Df=0.4 \times D^{3/5}$ to $Df=0.7 \times D^{3/5}$, seen in the plane extending perpendicularly to the rotational axis. In this manner, an adequate flow of coolant to the front end portion of the drill body in order to transport cutting chips from the front end portion of the drill body out of the hole may be achieved at a normal coolant pressure, e.g. 4 Bar.

According to embodiments, each of the two coolant channels may be arranged at a distance dc within a range of dc=0.20×D to dc=0.35×D from the centre line of the peripheral chip flute cross section. In this manner, the coolant channels may be arranged at a distance from the peripheral chip flute such that the coolant channels are neither punctured during manufacturing of the drill body, nor punctured during use of the drill, as cutting chips may wear down the peripheral chip flute.

According to embodiments, the peripheral chip flute may have a cross sectional shape corresponding to the peripheral chip flute cross section from a distance within a range of 0.25×D to 1×D from a front end of the drill body to a rear end of the drilling length L. In this manner, the peripheral chip flute has a cross sectional shape corresponding to the peripheral chip flute cross section defined above along a substantial length of the drill body, at least for drills having a drilling length L≥2×D.

According to embodiments, the central chip flute cross section may have a maximum depth Dp, seen along a centre line of the central chip flute cross section, within a range of Dp=0.75×D/2 to Dp=0.90×D/2, and a maximum width W, seen perpendicularly to the centre line of the central chip flute cross section, within a range of W=0.75×D/2 to W=0.90×D/2, and wherein the maximum width W extends symmetrically about the centre line of the central chip flute cross section. In this manner, cutting chips from the central cutting insert may readily fit inside the central chip flute, while a cross section of the drill body in the plane extending perpendicularly to the rotational axis provides high bending stiffness and torsional stiffness.

Herein, the term maximum depth means the deepest part of the central chip flute cross section measured from the circumscribed circle of the drill body in the plane extending perpendicularly to the rotational axis. The depth at a point on the surface of the chip flute is the shortest distance between that point and the circumscribed circle. The term maximum width means the widest part of the central chip flute cross section.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which:

FIGS. 2a and 2b illustrate two views of the drill of FIGS. 1a-1e,

DETAILED DESCRIPTION

Figure 1A:
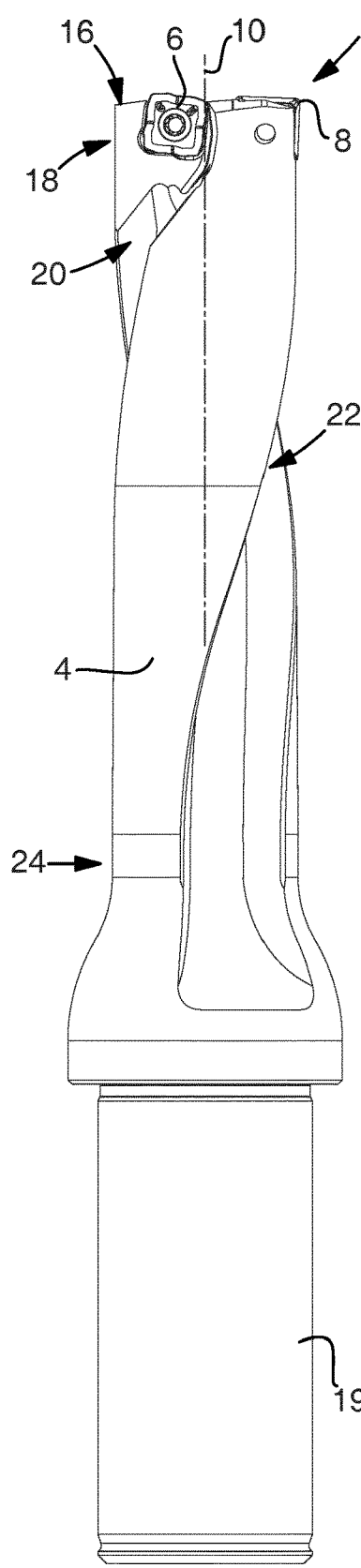
FIGS. 1a-1e illustrate views of a drill according to embodiments.
Figure 1B:
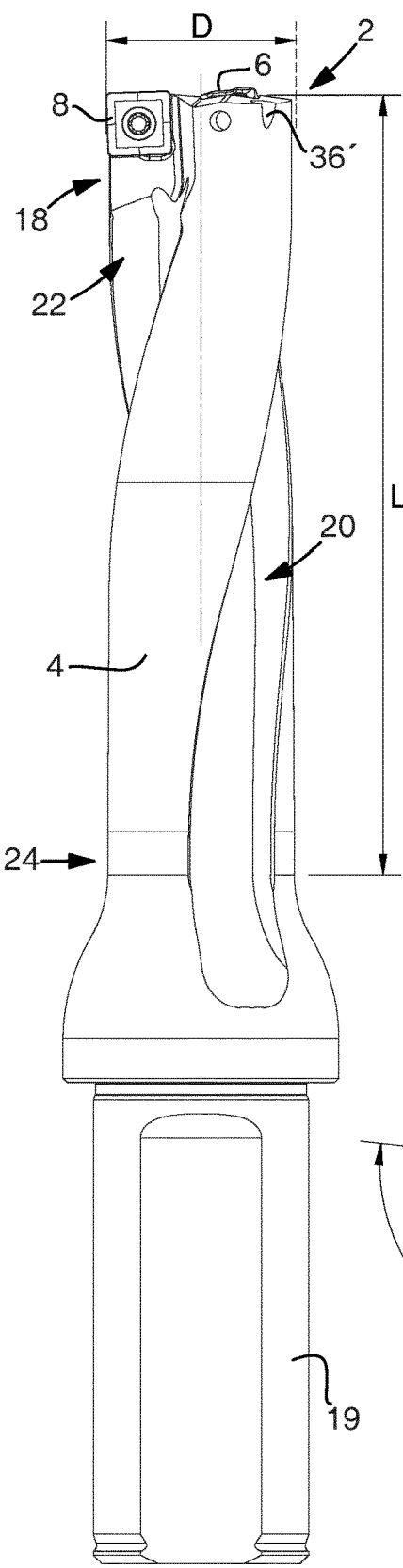

Aspects and/or embodiments of the invention will now be described more fully. Like numbers refer to like elements throughout. Well-known functions or constructions will not necessarily be described in detail for brevity and/or clarity.

FIGS. 1a-1e illustrate views of a drill 2 according to embodiments. The drill 2 is configured for metal cutting, i.e. for drilling holes in a metal workpiece. The drill 2 comprises a drill body 4, a central cutting insert 6, and a peripheral cutting insert 8. The central cutting insert 6 and the peripheral cutting insert 8 are indexable, i.e. comprise more than one cutting edge, wherein an active cutting position of a cutting edge corresponds to an index position of the cutting insert. The drill body 4 has a rotational axis 10 and is provided with a central insert seat 12 and a peripheral insert seat 14 at a front end portion 18 of the drill body 4. The front end portion 18 forms a portion of the drill body 4 adjacent to a front end 16 of the drill body 4. The central cutting insert 6 is configured for cutting a central portion of a hole, and the peripheral cutting insert 8 is configured for cutting a peripheral portion of the hole. The central cutting insert 6 is arranged in the central insert seat 12, and the peripheral cutting insert 8 is arranged in the peripheral insert seat 14. Accordingly, the central insert seat 12 is configured for receiving the central cutting insert 6, and the peripheral insert seat 14 is configured for receiving the peripheral cutting insert 8.

Figure 1C:
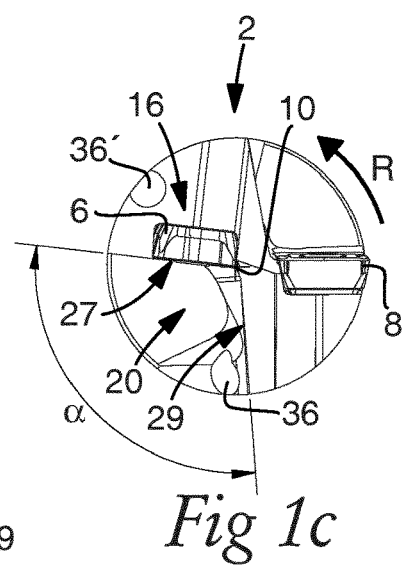
Figure 1D:
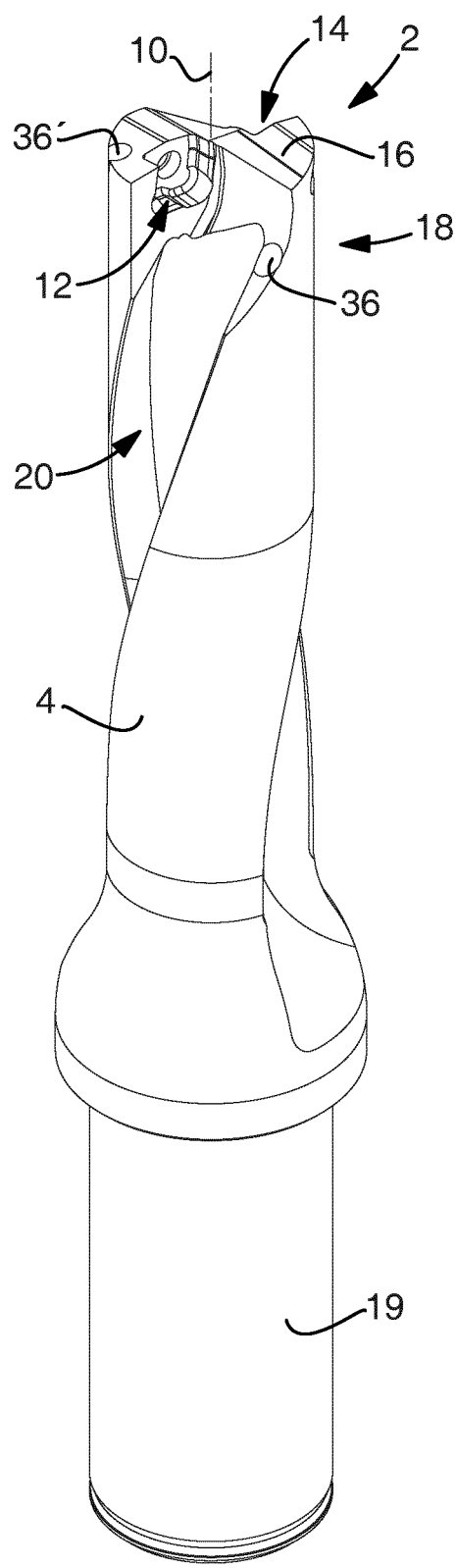
Figure 1E:
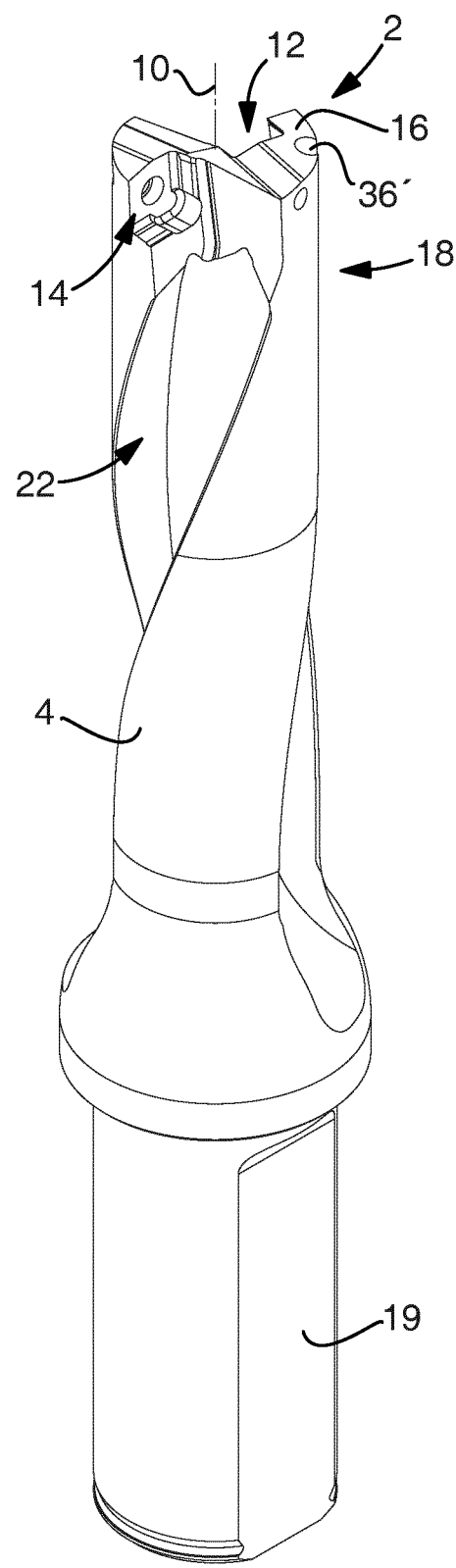

The drill 2 is arranged for cutting by being rotated in the direction R, indicated in FIG. 1c. The drill 2 is configured for drilling a hole having a diameter D. That is, together, the central and peripheral cutting inserts 6, 8 provide cutting edges for cutting a hole having the diameter D. Mentioned purely as an example, the diameter D may be within a range of D=15-65 mm.

According to embodiments, the central cutting insert 6 may be configured for cutting in an axial direction of the hole with a cutting length in a radial direction of approximately D/4, and the peripheral cutting insert 8 may be configured for cutting in the axial radial direction of the hole with a cutting length in the radial direction of approximately D/4. In this manner, cutting forces acting on the cutting inserts 6, 8 may be balanced between the two cutting inserts 6, 8.

According to embodiments, the drill body 4 may have a drilling length, L, within a range of 1×D to 8×D. The drilling length of the drill body 4 corresponds to the maximum hole depth to be drilled with the drill, less the axial depth provided by the cutting inserts 12, 14. The cross sectional areas of the central chip flute and the peripheral chip flute discussed herein are particularly advantageous in drills having drilling bodies 4 with a drilling length L in the upper portion of the range. Thus, according to some embodiments, the drill body 4 may have a drilling length L within a range of L=3×D to L=8×D, or within a range of L=4×D to L=8×D.

The drilling length L of the illustrated embodiments is approximately, L=4×D. The drill body 4 comprises a shank 19 for securing the drill 2 in a machine, such as in a chuck of a machine.

The drill body 4 comprises a central chip flute 20 extending from the central insert seat 12 along a periphery of the drill body 4. The drill body 4 comprises a peripheral chip flute 22 extending from the peripheral insert seat 14 along a periphery of the drill body 4.

In these embodiments, the central chip flute 20 as well as the peripheral chip flute 22 comprises a helical portion, extending from the front end 16 partially along the drill body 4 towards a rear end 24 of the drilling length of the drill body 4. At the rear end 24 of the drilling length of the drill body 4, the central chip flute 20 and the peripheral chip flute 22 each extend straight along the drill body 4, in parallel with the rotational axis 10.

In alternative embodiments, the helical portions may be shorter than in the illustrated embodiments, or longer than in the illustrated embodiments. According to some embodiments, the chip flutes do not comprise any straight portions, but are helical along the entire drilling length.

Figure 2C:
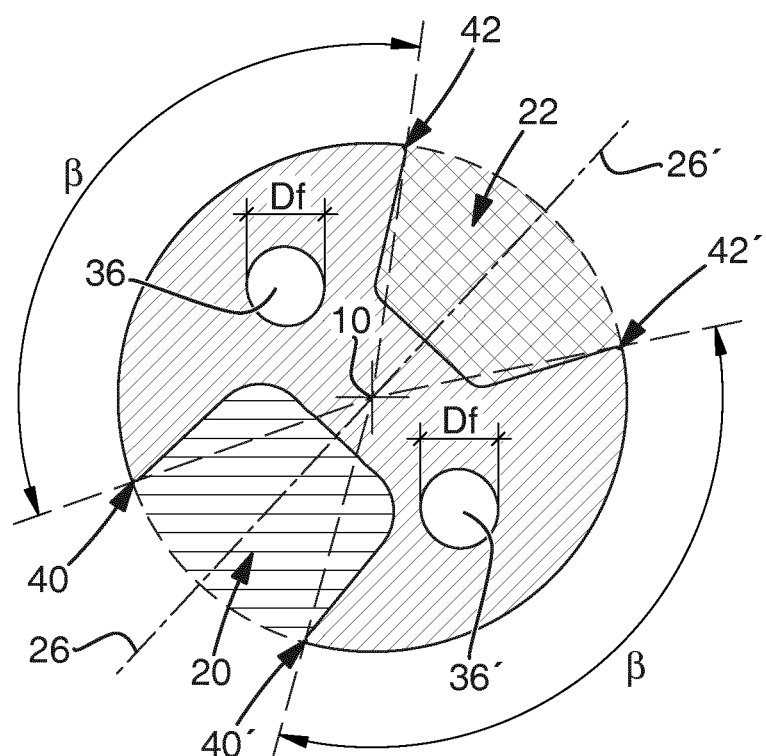
FIGS. 2c and 2d illustrate cross sectional views through the drill along lines IIc-IIc and IId-IId in FIG. 2a, and FIGS. 3a-3d show cross sections of peripheral and central chip flutes.
Figure 2D:
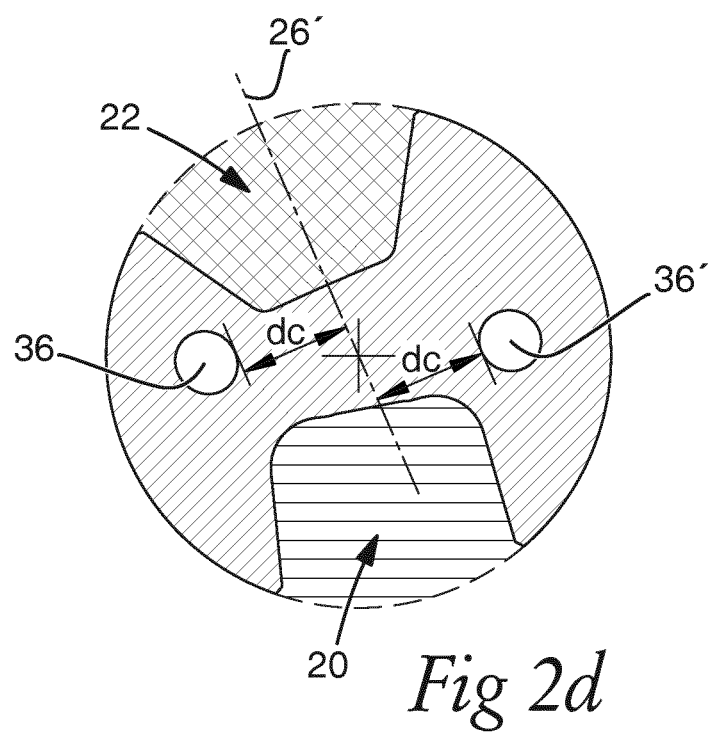

FIGS. 2a and 2b illustrate two views of the drill body 4 of FIGS. 1a-1e. In the views of FIGS. 2a and 2b the central chip flute 20 and the peripheral chip flute 22 are clearly shown. Moreover, FIGS. 2c and 2d illustrate two cross sectional views through the drill body 4 along lines IIc-IIc and IId-IId in FIG. 2a.

The drill body 4 has a cross sectional shape, seen perpendicularly to the rotational axis 10. The cross sectional shape of the drill body 4 varies depending on where along the drilling length the cross section is positioned. Naturally, the cross sectional shape of the drill body 4 depends on the cross sectional shapes of the central chip flute 20 and the peripheral chip flute 22. At the front end portion 18 and briefly passed the insert seats, the cross sectional shape of the drill body 4 is distinctly different from the cross sectional shape farther away from the front end portion 18. This depends on the chip flutes 20, 22 having wide openings at the cutting inserts. Past the front end portion 18, the chip flutes 20, 22 are adapted for leading cutting chips along the drill body 4 out of a hole being drilled.

According to the invention, the peripheral chip flute 22 is configured for a smooth guiding of the cutting chips from the peripheral cutting insert, while providing a cross sectional shape of the drill body which has high bending stiffness and torsional stiffness.

According to a further aspect of the invention, additionally, the central chip flute 20 is configured for a smooth guiding of the cutting chips from the central cutting insert, while providing a cross sectional shape of the drill body 4 which has high bending stiffness and torsional stiffness.

The peripheral chip flute 22 has a peripheral chip flute cross section in a plane extending perpendicularly to the rotational axis 10. In FIGS. 2c and 2d the peripheral chip flute cross section is shown with cross line hatching. The peripheral chip flute cross section is formed within a circumscribed circle of the drill body 4 in the plane extending perpendicularly to the rotational axis 4, as indicated by broken lines in FIGS. 2c and 2d. As mentioned above, the cross sections illustrated in FIGS. 2c and 2d are examples of such a plane extending perpendicularly to the rotational axis 10. Approximately, from the cross section shown in FIG. 2d and rearwardly towards the rear end 24, the peripheral chip flute cross section is the same as shown in FIGS. 2c and 2d.

The central chip flute 20 has a central chip flute cross section in a plane extending perpendicularly to the rotational axis 10. In FIGS. 2c and 2d the central chip flute cross section is shown with single line hatching. The central chip flute cross section is formed within a circumscribed circle of the drill body 4 in the plane extending perpendicularly to the rotational axis, as indicated by broken lines in FIGS. 2c and 2d. The cross sections illustrated in FIGS. 2c and 2d are examples of such a plane extending perpendicularly to the rotational axis 10. Approximately, from the cross section shown in FIG. 2d and rearwardly towards the rear end 24, the central chip flute cross section is the same as shown in FIGS. 2c and 2d.

Figure 3A:
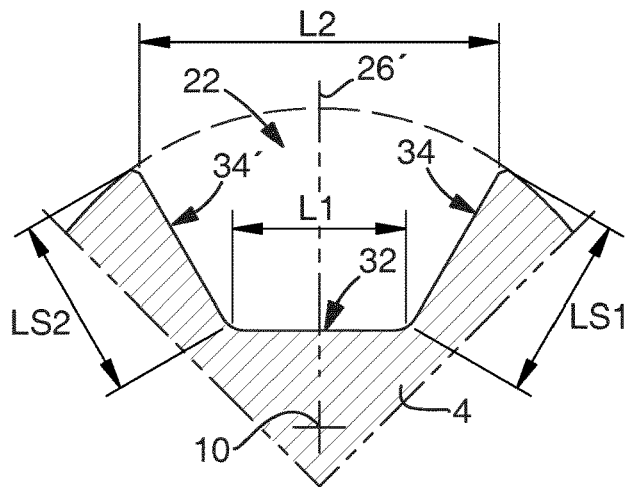

FIG. 3a shows an enlargement of the peripheral chip flute 22 and the peripheral chip flute cross section of FIGS. 2c and 2d. The peripheral chip flute cross section has a centre line 26' extending in the plane extending perpendicularly to the rotational axis 10, and through the rotational axis 10. The peripheral chip flute cross section has a radially inner side 32 extending perpendicularly to the centre line 26', and a first lateral side 34 and an opposite second lateral side 34' connecting to the radially inner side 32. The radially inner side 32 may be substantially straight, and the first and second lateral sides 34, 34' may be substantially straight. The transitions between the radially inner side 32 and the first and second lateral sides 34, 34' may be rounded in order to avoid concentration of stress in the drill body 4.

The radially inner side 32 has a length L1 within a range of L1=0.95×D/4 to L1=1.2×D/4, wherein each of the first and second lateral sides 34, 34' has a length LS1, LS2 within a range of LS1 (LS2)=D/4 to LS1 (LS2)=1.3×D/4. The first and second lateral sides 34, 34' diverge from each other in a direction radially outwards from the radially inner side 32.

Since the peripheral chip flute cross section has dimensions within ranges as defined above, the cross section of the drill body 4 includes material at a radial distance far from the rotational axis 10, compared to the cross sections of many prior art drill bodies, such as e.g. of the drill having chip flutes with J-shaped cross sections, described in the above mentioned U.S. Pat. No. 8,668,409. Thus, the cross section in the plane extending perpendicularly to the rotational axis 10 of present drill body 4 provides high bending stiffness and torsional stiffness.

The cutting chips from the peripheral cutting insert may have an approximately isosceles trapezium shaped seen in a top view of a cutting chip, with approximate measures as follows: side lengths D/4, long base edge 1.9×D/4, and short base edge 0.9×D/4. The long base edge of a cutting chip faces outwardly seen in a top view of the peripheral chip flute. Thus, the cutting chips will readily fit inside the peripheral chip flute having dimensions as discussed above, for being guided therein out of the hole being drilled.

The radially inner side 32 extends symmetrically about the centre line 26' of the peripheral chip flute cross section. In these embodiments, the first and second lateral sides 34, 34' diverge symmetrically from each other about the centre line 26'. Accordingly, the first and second lateral sides 34, 34' have the same lengths in these embodiments, and the peripheral chip flute cross section is symmetrical about the centre line 26' of the peripheral chip flute 22, and the cross section of the drill body 4 is symmetrical about the peripheral chip flute 22. Thus, the cross section of the drill body 4 extends the same radial distance from the rotational axis 10 on both sides of the peripheral chip flute 22. Also for this reason, the cross section of the present drill body 4, in the plane extending perpendicularly to the rotational axis 10, provides high bending and torsional stiffness. Of course, cutting chips from the peripheral cutting insert are readily guided along the peripheral chip flute 22 out of a hole being drilled.

Figure 3B:
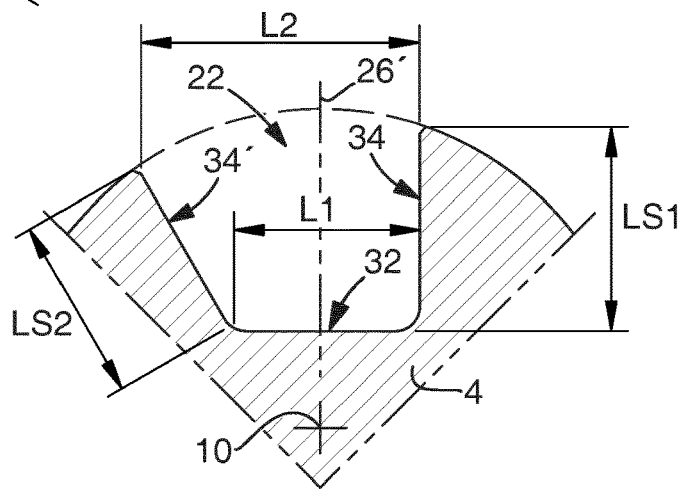

FIG. 3b shows embodiments of a peripheral chip flute 22, wherein the first lateral side 34 extends perpendicularly to the radially inner side 32. Accordingly, in alternative embodiments of the drill body 4 shown in FIGS. 1a-2b, the peripheral chip flute 22 may have a peripheral chip flute cross section with one of the lateral sides extending in parallel with the centre line 26', while the first and second lateral sides 34, 34' diverge from each other in a direction radially outwards from the radially inner side 32. Again, the centre line 26' extends in the plane extending perpendicularly to the rotational axis 10, and through the rotational axis 10.

Also in these embodiments, the radially inner side 32 has a length L1 within a range of L1=0.95×D/4 to L1=1.2×D/4, and each of the first and second lateral sides 34, 34' has a length LS1, LS2 within a range of LS1 (LS2)=D/4 to LS1 (LS2)=1.3×D/4. Again, the radially inner side 32 extends symmetrically about the centre line 26' of the peripheral chip flute cross section.

Within the above defined length range of the first and second lateral sides 34, 34', the peripheral chip flute cross section still provides room for cutting chips from the peripheral cutting insert the guided through the peripheral chip flute 22 out of a hole being drilled, while the cross section of the drill body 4 in the plane perpendicular to the rotational axis 10 provides high bending stiffness and torsional stiffness due to the cross section of the drill body 4 extending a far distance radially from the rotational axis 10 over a large portion of the cross section of the drill body 4.

In both embodiments of the peripheral chip flute cross sections shown in FIGS. 3a and 3b, ends of the first and second lateral sides 34, 34' opposite to the radially inner side 32 are arranged at a distance L2 from each other within a range of L2=1.85×D/4 to L2=2.5×D/4. Thus, the first and second lateral sides 34, 34' diverge from each other sufficiently for cutting chips from the peripheral cutting are easily guided through the peripheral chip flute 22, while the cross section of the drill body 4 provides high bending and torsional stiffness.

The lengths L1, LS1, LS2, L2 are measured between the intersection points between the distances.

Returning to FIGS. 1a, 1b, 2a, and 2b, the peripheral chip flute 22 has a cross sectional shape corresponding to the central peripheral flute cross section discussed in connection with FIG. 2c, 2d, 3a, or 3b extending along a partial length of the drill body 4, e.g. from the cross section indicated with arrows IId-IId in FIG. 2a to the rear end 24 of the drilling length L.

According to some embodiments, the peripheral chip flute 22 may have a cross sectional shape corresponding to the peripheral chip flute cross section along at least half the drilling length L. The peripheral chip flute cross section is the peripheral chip flute cross section discussed in connection with FIG. 2c, 2d, 3a, or 3b.

The peripheral chip flute 22 may have has a cross sectional shape corresponding to the peripheral chip flute cross section from a distance within a range of 0.25×D to 1×D from the front end 16 of the drill body 4 to the rear end 24 of the drilling length L.

Figure 3C:
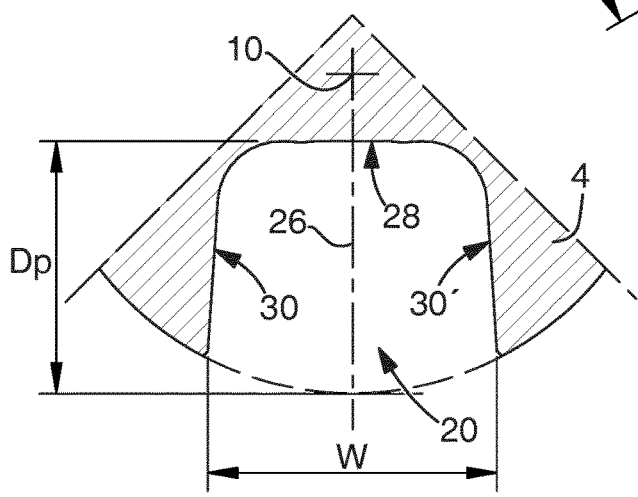

FIG. 3c shows an enlargement of the central chip flute 20 and the central chip flute cross section of FIGS. 2c and 2d. The central chip flute cross section has a centre line 26 extending in the plane extending perpendicularly to the rotational axis 10, and extending through the rotational axis 10. The central chip flute cross section has a depth, seen along the centre line 26, and a width, seen perpendicularly to the centre line 26.

The central chip flute cross section has a maximum depth Dp within a range of Dp=0.75×D/2 to Dp=0.90×D/2, and a maximum width W within a range of W=0.75×D/2 to W=0.90×D/2. The maximum width W extends symmetrically about the centre line 26, i.e. the maximum width W extends equal distances from the centre line 26. According to some embodiments the central chip flute cross section has a maximum depth Dp within a range of Dp=0.8×D/2 to Dp=0.86×D/2, and a maximum width W within a range of W=0.8×D/2 to W=0.86×D/2.

Since the central chip flute cross section has a depth and a width within ranges as defined above, the cross section of the drill body 4 includes material at a radial distance far from the rotational axis 10. Thus, the cross section in the plane extending perpendicularly to the rotational axis 10 of present drill body 4 provides high bending stiffness and torsional stiffness. Moreover, since the maximum width extends symmetrically about the centre line 26, the cross section of the drill body 4 extends substantially the same radial distance from the rotational axis 10 on both sides of the central chip flute 20. Also for this reason, the cross section of the present drill body 4, in the plane extending perpendicularly to the rotational axis 10, provides high bending and torsional stiffness.

A diameter of helically shaped cutting chips from the central cutting insert may be within a range of 0.7-0.8 times a radius of the hole being drilled, i.e. D/2. Thus, the cutting chips will readily fit inside the central chip flute having dimensions as discussed above, for being guided therein out of the hole being drilled.

The central chip flute 20 may have this cross section along a substantial part of the drill body 4. For instance, over the same exemplified distances of the drilling length as the peripheral chip flute 22 has the peripheral chip flute cross section according to embodiments discussed herein. Thus, the bending and torsional stiffness of the drill body 4 and thus, also of the drill, is high.

In these embodiments, the central chip flute cross section has a radially inner side 28 extending perpendicularly to the centre line 26 and forming a substantially straight portion, and lateral sides 30, 30' extending substantially in parallel with each other along at least a portion of the centre line 26. The transitions between the radially inner side 28 and the lateral sides 30, 30' may be rounded at a smaller or larger degree. In order to avoid concentration of stress at the transitions, a sharp corner may be avoided. Fully rounded transitions mean that the central chip flute cross section is U-shaped, see below with reference to FIG. 3d.

The lateral sides 30, 30' extending substantially in parallel with each other means that each of the lateral sides 30, 30' extends at an angle within a range of 0-5 degrees to the centre line 26.

The central chip flute cross section is symmetric about the centre line 26. Thus, also the cross section of the drill body 4 in the plane perpendicular to the rotational axis 10 is symmetric about the centre line 26 adjacent to the central chip flute 20, and the cross section of the drill body 4 extends the same radial distance from the rotational axis 10 on both sides of the central chip flute 20. As mentioned above, thus, the cross section of the drill body 4, in the plane extending perpendicularly to the rotational axis 10, provides high bending and torsional stiffness.

Figure 3D:
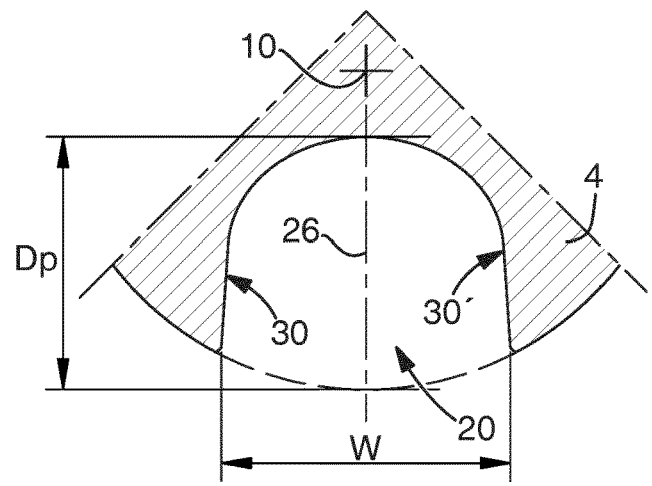

FIG. 3d shows embodiments of a central chip flute 20, wherein the central chip flute cross section is substantially U-shaped. Accordingly, in alternative embodiments of the drill body 4 shown in FIGS. 1a-2b, the central chip flute 20 may have a U-shaped central chip flute cross section. Again, the central chip flute cross section has a centre line 26 extending in the plane extending perpendicularly to the rotational axis 10, and extending through the rotational axis 10. The central chip flute cross section has a depth, seen along the centre line 26, and a width, seen perpendicularly to the centre line 26.

Also in these embodiments, the central chip flute cross section has a maximum depth Dp within a range of Dp=0.75×D/2 to Dp=0.90×D/2, and a maximum width W within a range of W=0.75×D/2 to W=0.90×D/2. The maximum width W extends symmetrically about the centre line 26.

Again, the central chip flute cross section is symmetric about the centre line 26. Thus, also the cross section of the drill body 4 in the plane perpendicular to the rotational axis 10 is symmetric about the centre line 26 adjacent to the central chip flute 20, and the cross section of the drill body 4 extends the same radial distance from the rotational axis 10 on both sides of the central chip flute 20. As mentioned above, thus, the cross section of the drill body 4, in the plane extending perpendicularly to the rotational axis 10, provides high bending stiffness and torsional stiffness.

The lateral sides 30, 30' of the U-shaped cross section may extend at an angle within a range of 0-5 degrees to the centre line 26.

Returning to FIGS. 2a and 2c, the central chip flute cross section may be arranged opposite to the peripheral chip flute cross section, and wherein the centre line of the peripheral chip flute cross section is collinear with a centre line of the central chip flute cross section. Along the portion of the drill body 4 where the central chip flute cross section and the peripheral chip flute cross section may have the same centre line 26, 26', i.e. the centre lines 26, 26' of each of the central chip flute cross section and the peripheral chip flute cross section, may be collinear. In these embodiments, the central chip flute cross section is arranged opposite to the peripheral chip flute cross section along the portion of the drill body 4, where the central chip flute 20 and the peripheral chip flute 22 extend straight along the drill body 4, in parallel with the rotational axis 10.

The web thickness of the drill body 4, as seen in the cross section where the central chip flute 20 is arranged opposite to the peripheral chip flutes 22, may be within a range of 0.20×D to 0.30×D. The web is the material in between the central chip flute 20 and the peripheral chip flute 22.

In FIG. 2c two angles β are shown, indicating portions of the cross section of the drill body 4 where the radial distance of the drill body 4 extends the maximum radial distance possible with respect to the diameter of the drill body 4. These angles β are considerably wider than in drill bodies of prior art drills. Thus, the cross section of the drill body 4, in the plane extending perpendicularly to the rotational axis 10, provides high bending stiffness and torsional stiffness. According to some embodiments, each of the angles β is within a range of 110-120 degrees. According to some embodiments, both angles β are of the same size.

The lateral sides 30, 30' of the central chip flute cross section, see FIGS. 3a and 3b, intersect with the circumscribed circle of the drill body 4 in the plane extending perpendicularly to the rotational axis 10 at respective intersection points 40, 40'. The first and second lateral sides 34, 34' of the peripheral chip flute cross section, see FIG. 3c, intersect with the circumscribed circle of the drill body 4 in the plane extending perpendicularly to the rotational axis 10 at respective junction points 42, 42'. Each of the angles β may be defined as an angle β extending between an intersection point 40, 40' and a circumferentially adjacent junction point 42, 42'.

The drill body 4 comprises at least one coolant channel 36, 36'. The at least one coolant channel 36, 36' leads from the shank 19 of the drill body 4 to an opening, or openings, at the front end portion 18 of the drill body 4.

In these embodiments, the drill body 4 comprises two coolant channels 36, 36'. Each of the coolant channels has a diameter Df within a range of Df=0.4×$D^{3/5}$ to Df=0.7×$D^{3/5}$, seen in the plane extending perpendicularly to the rotational axis 10. Thus, the flow of coolant through the coolant channels 36, 36' may be sufficient for transporting cutting chips from the front end portion of the drill body 4 out of the hole being drilled, at a normal coolant pressure of e.g. 4 Bar.

The above discussed dimensions of the central chip flute cross section and the peripheral chip flute cross section provides for the coolant channels 36, 36' to be arranged within the drill body 4 at a distance from the central chip flute 20 and the peripheral chip flute 22 such that the coolant channels 36, 36' are neither punctured during manufacturing of the drill body 4, nor punctured during use of the drill 2 as cutting chips may wear down the central and/or peripheral chip flute 20, 22.

Each of the two coolant channels 36, 36' may be arranged at a distance dc within a range of dc=0.20×D to dc=0.35×D from the centre line 26' of the peripheral chip flute cross section, see FIG. 2d. Thus, the coolant channels 36, 36' may be arranged at a safe distance from the peripheral chip flute to ensure that the coolant channels 36, 36' remain undamaged during manufacturing of the drill body and during use of the drill. The distance dc is measured perpendicularly to the centre line 26' of the peripheral chip flute cross section.

Just mentioned briefly, during manufacturing of the drill body the coolant channels are drilled as straight holes. Then, the drill body is twisted about the rotational axis. Thereafter, the central and peripheral chip flutes are milled, including their helical portions, in the drill body.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A drill body for a drill comprising:
a rotational axis;
a central insert seat;
a peripheral insert seat located at a front end portion of the drill body, wherein the central insert seat is configured for receiving a central cutting insert arranged for cutting a central portion of a hole having a hole diameter D, and the peripheral insert seat is configured for receiving a peripheral cutting insert for cutting a peripheral portion of the hole; and
a central chip flute extending from the central insert seat along a periphery of the drill body and a peripheral chip flute extending from the peripheral insert seat along a periphery of the drill body, and wherein the central chip flute has a central chip flute cross-section in a plane extending perpendicularly to the rotational axis, and the peripheral chip flute has a peripheral chip flute cross-section in the plane extending perpendicularly to the rotational axis, each of the central chip flute cross-section and the peripheral chip flute cross-section being formed within a circumscribed circle of the drill body in the plane extending perpendicularly to the rotational axis, wherein the peripheral chip flute cross-section has a centre line extending in the plane and through the rotational axis, wherein the peripheral chip flute cross-section has a radially inner side extending perpendicularly to the centre line, and a first lateral side and an opposite second lateral side connecting to the radially inner side, wherein the radially inner side has a length L1 within a range of $L1=0.95\times D/4$ to $L1=1.2\times D/4$, wherein each of the first and second lateral sides has a length LS1, LS2 within a range of $D/4$ to $1.3\times D/4$ and wherein the first and second lateral sides diverge from each other in a direction radially outwards from the radially inner side, wherein the peripheral chip flute has a cross-sectional shape corresponding to the peripheral chip flute cross-section along a partial length of the drill body.

2. The drill body according to claim 1, wherein the radially inner side extends symmetrically about the centre line.

3. The drill body according to claim 1, wherein the first lateral side extends perpendicularly to the radially inner side.

4. The drill body according to claim 1, wherein the first and second lateral sides diverge symmetrically from each other about the centre line.

5. The drill body according to claim 1, wherein ends of the first and second lateral sides opposite to the radially inner side are arranged at a distance L2 from each other within a range of $L2=1.85\times D/4$ to $L2=2.5\times D/4$.

6. The drill body according to claim 1, wherein the drill body includes at least one coolant channel.

7. The drill body according to claim 1, wherein drill body includes two coolant channels.

8. The drill body according to claim 7, wherein each of the coolant channels has a diameter Df within a range of $Df=0.4\times D^{3/5}$ to $Df=0.7\times D^{3/5}$, seen in the plane extending perpendicularly to the rotational axis.

9. The drill body according to claim 7, wherein each of the two coolant channels is arranged at a distance dc within a range of $dc=0.20\times D$ to $dc=0.35\times D$ from the centre line of the peripheral chip flute cross-section.

10. The drill body according to claim 1, wherein the drill body has a drilling length within a range of $1\times D$ to $8\times D$.

11. The drill body according to claim 10, wherein the peripheral chip flute has a cross-sectional shape corresponding to the peripheral chip flute cross-section along at least half the drilling length.

12. The drill body according to claim 10, wherein the peripheral chip flute has a cross-sectional shape corresponding to the peripheral chip flute cross-section from a distance within a range of $0.25\times D$ to $1\times D$ from a front end to a rear end of the drilling length.

13. The drill body according to claim 1, wherein the central chip flute cross-section has a maximum depth Dp, seen along a centre line of the central chip flute cross-section, within a range of $Dp=0.75\times D/2$ to $Dp=0.90\times D/2$, and a maximum width W, seen perpendicularly to the centre line (26) of the central chip flute cross-section, within a range of $W=0.75\times D/2$ to $W=0.90\times D/2$, and wherein the maximum width W extends symmetrically about the centre line of the central chip flute cross-section.

14. The drill body according to claim 13, wherein the central chip flute cross-section is arranged opposite to the peripheral chip flute cross-section, and wherein the centre line of the peripheral chip flute cross-section is collinear with a centre line of the central chip flute cross-section.

15. A drill for metal cutting comprising:
a drill body according to claim 1 having a rotational axis and being provided with a central insert seat and a peripheral insert seat at a front end portion of the drill body;
a central cutting insert arranged for cutting a central portion of a hole having a hole diameter D arranged in the central insert seat; and
a peripheral cutting insert arranged for cutting a peripheral portion of the hole arranged in the peripheral insert seat.

16. The drill according to claim 15, wherein the central cutting insert is configured for cutting in an axial direction of the hole with a cutting length in a radial direction of approximately D/4, and wherein the peripheral cutting insert is configured for cutting in the axial radial direction of the hole with a cutting length in the radial direction of approximately D/4.

* * * * *